J. NEFF, Jr.
CULTIVATOR.
No. 75,185. Patented Mar. 3, 1868.
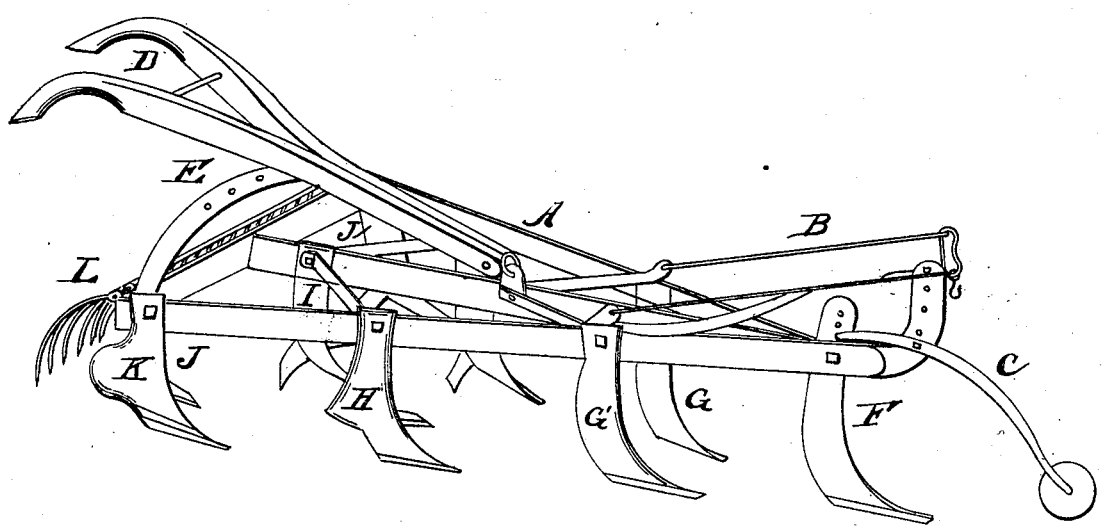
Witnesses:
John L. Lewis
Charles Ketchum
Inventor:
John Neff, Jr.

United States Patent Office.

JOHN NEFF, JR., OF PULTNEY, NEW YORK.

Letters Patent No. 75,185, dated March 3, 1868.

---

IMPROVEMENT IN CULTIVATORS.

---

*The Schedule referred to in these Letters Patent and making part of the same.*

---

TO ALL WHOM IT MAY CONCERN:

Be it known that I, JOHN NEFF, Jr., of Pultney, in the county of Steuben, and State of New York, have invented a new and useful Improvement in Cultivators; and I do hereby declare that the following is a full, clear, and exact description of the construction and operation of the same, reference being had to the annexed drawings, making a part of this specification, in which the figure is a perspective view of the whole cultivator.

The nature of my invention consists in making a cultivator to be used in vineyards, nurseries, and orchards; it may also be used for other purposes. The teeth are so constructed that it will work in any kind of soil or condition of soil where grapes or fruit will grow, and its parts are so arranged that it may be drawn and held as close to the vines or trees as it is proper to cultivate, and it will cut off and gather the weeds, so as to prevent them growing after they have been cut off or pulled up.

To enable others skilled in the art to make and use my invention, I will proceed to describe its mode of construction and operation.

A is the frame that holds the other parts in position; it is made of bars of iron or steel, and is held together by bolts that hold the other parts, and it is braced to prevent the bars of the frame yielding. One of the side-pieces of the frame is turned up at the forward end to hold the draught-rod in proper position. The frame may be made any size required, and its shape is represented in the figure.

B is the draught-rod; it is made in shape as represented in the figure. The rear ends are held by ears that are held to the frame by the bolts that hold the teeth and braces together. It is shaped so that one side will be in line with the centre of the frame, and the other side may be made to extend as far to the left as is desirable. The forward end is shaped so that the draught-hook will draw in line of the centre of the frame, or at the left side, and its position may be readily changed as the work to be done requires. When it is preferable to run the other side of the cultivator close to the vines, this draught-rod may be turned over, and it will work equally well. The straight side is supported by a spring that is used to hold the cultivator down to the ground, and the rod up to the bolt, as shown in the figure, and the forward end may be raised or lowered, and held down by a pin or bolt that is put through one of the holes in the forward part of the frame that is turned up, as before specified.

C is the regulator. The arm of it is made as represented in the figure, and is held by a bolt to the forward part of the frame. The rear end is held by the upper end of the forward tooth, so that it may be adjusted to allow the teeth to go into the ground any required depth. The forward end is provided with a wheel, that rolls upon the ground when the cultivator is being used.

D are the handles. They may be made of wood, and bent and fastened together, as shown in the figure. The forward end is held by a hook in an ear that is fastened to the frame by a bolt that holds the braces. The rear ends of the handles are held in position by a semicircular support, so that they may be changed to any position to suit the various places where the cultivator may be used, such as hill-sides, and among vines or trees that have projecting branches.

E is a semicircular support for the handles; it is held to the rear end of the frame by the bolts that hold the hind teeth, as shown in the figure; it is provided with a series of holes at the upper portion, for the purpose of adjusting the handles and holding them in any required position.

F is the forward tooth; it may be made of any metal. The lower end may have a point that will pass through the ground without displacing it, only loosening it. The upper end is held between the side-pieces of the frame, and above the frame are holes for holding and adjusting the regulator C.

G and G are teeth made of thin steel, and in pairs; they have a point made by turning the lower end at right angles either way. The upper end is bent over the upper edge of the frame, and an offset is made at the lower edge of the frame to keep the teeth in position, and they are held to the frame by bolts. These teeth only cut into the earth without removing it.

H is one of a pair of teeth, made of thin steel; they have a point made by turning the lower part at right angles; they also have a wing or cutter made by turning a portion of the tooth in the opposite direction from the point, or at right angles to the upright portion of the tooth. The forward edge of the wing is made sharp to cut off the weeds. The upper ends are fitted to the frame the same as the teeth G, and are held by bolts in the same manner.

I is a tooth, made of sheet metal or thin steel, without any point, other than the plain end of the steel. The point extends below the wings, for the purpose of having the ground through which it passes aid in holding the tooth and preventing torsion by the wings when they are operating. This tooth is provided with a pair of wings, one at each side; they are riveted to it at the proper height to cut off the weeds. The outer ends of the wings are farther ahead than the end next to the teeth. The upper end of the tooth is fitted to the frame as the other teeth are, and it is held by a bolt that passes through it and the frame and rear end of the hind braces.

J and J are the hind teeth; they are made and held in the same manner as the teeth H; and perform the same kind of labor. The outer ends of these wings are farther ahead than the end at the tooth. The points of these teeth extend into the ground deeper or below where the wings cut.

K is a furrow-board; it may be made any size or shape required. The upper end is held by the same bolt that holds the tooth to which it is applied. The lower part terminates with a hook, that hooks upon the forward edge of the tooth. This board may be attached to any or all of the teeth; their use is to turn a furrow or remove the earth when used in corn, and they may be desirable in many other places.

L is a rake; it may be made any size, and with any number of teeth, and the teeth may be fastened to any kind of head preferred; it is held in position by a hook at each end, that hooks into ears that are held by the bolts that hold the hind teeth, so that the rake may be raised or lowered at will. The use of this rake is to gather the weeds, and thus clear the ground, and prevent the weeds from growing after they have been cut off by the wings.

Having thus fully described my invention, what I claim as new, and desire to secure by Letters Patent, is—

1. The draught-rod B, when made and applied and supported by a spring, as specified.
2. I claim the method of fastening and adjusting the handles by means of the support E, as set forth.
3. I claim the teeth F, G, H, I, and J, when constructed and arranged substantially as specified; also the furrow-board, when made and applied to the teeth, substantially as set forth.

JOHN NEFF, Jr.

Witnesses:
    JOHN L. LEWIS,
    CHARLES KETCHUM.